United States Patent [19]

Rasimus et al.

[11] Patent Number: 5,702,183

[45] Date of Patent: Dec. 30, 1997

[54] DISCHARGE APPARATUS HAVING ORBITALLY MOVING DISCHARGE RING

[75] Inventors: Seppo Rasimus; Heikki Tolvanen, both of Savonlinna, Finland

[73] Assignee: Saimatec Engineering Oy, Finland

[21] Appl. No.: 420,085

[22] Filed: Apr. 11, 1995

[30] Foreign Application Priority Data

Apr. 15, 1994 [FI] Finland .................. 941755

[51] Int. Cl.[6] .................................. B01F 15/02
[52] U.S. Cl. .............. 366/195; 366/314; 222/410; 414/304; 414/326
[58] Field of Search .............. 366/184, 194–196, 366/272, 314, 341; 414/304, 325, 326; 222/410

[56] References Cited

U.S. PATENT DOCUMENTS 2,534,442  12/1950  Harvey ................... 222/410 X

FOREIGN PATENT DOCUMENTS 832214  6/1983  Finland .
1133310  7/1960  Germany .
1328678  8/1987  U.S.S.R. .................. 222/410

Primary Examiner—Charles E. Cooley
Attorney, Agent, or Firm—Walter H. Dreger; Michael A. Kaufman

[57] ABSTRACT

A silo-like container includes an apparatus for discharging material within the container. The container interior bottom member leaves an annular opening with respect to the container walls, through which opening material may fall to be collected. A preferably toothed discharge ring is disposed above the interior bottom member and is rotated by a drive wheel. A retaining element preferably having teeth-like members is mounted adjacent the interior wall of the silo. As the discharge ring is rotated, planetary motion preferably about a silo axis occurs. The retaining element teeth-like members cooperate with the toothed portion of the discharge ring to urge rotational movement of the discharge ring about its own virtual axis. Discharge ring motion urges material within the silo radially outward toward the annular opening. The retaining element is mounted above the discharge ring such that the discharge ring is prevented from rising upward. The radially-outwardly urged material falls through the annular opening for collection beneath the silo interior bottom member.

20 Claims, 3 Drawing Sheets

DISCHARGE APPARATUS HAVING ORBITALLY MOVING DISCHARGE RING

FIELD OF THE INVENTION

The present invention relates to an apparatus for discharging different kinds of material from a silo or similar container.

BACKGROUND OF THE INVENTION

Silos are used to store various kinds of bulk material, such as different wood fractions used as raw material for various processes, or used as fuel in boilers for energy production. Such materials may include unsorted wood waste used for fuel (e.g., bark), screening waste, waste from demolished buildings, knots, and other less valuable wood materials. So-called forest processed chips is another type of fuel, and contains large amounts of unsorted components such as twigs, needles, and pieces of wood.

It is not expedient to grade or homogenize bulk material to be used as fuel because such material will burn in a boiler even if large particles are present. However, such non-uniform mixed material is difficult to handle. More particularly, it is difficult to discharge such material from a silo because the material tends to cake together and does not flow readily downward by itself. Further, longer particles in the material can cause feed disturbances.

Usually this type of cumbersome material is unloaded from a silo using linearly operated rake or pole dischargers. In such dischargers, the material in the silo is discharged through a lateral discharge opening for further transport to the site of use. Such dischargers are particular heavy and require substantial operating power because they must move material simultaneously over the whole area of the silo bottom and "ram" the material in one or two directions. Moreover, such discharge systems require substantial space because they use a hydraulic drive. An additional disadvantage with silos having rectangular design is the heavy structure required by their flat side walls.

It can be disadvantageous to discharge material through the center of a silo in that the material must be moved through convergent holes and complex channels. As noted above, non-homogeneity and material setting or caking can hamper discharge system flow, which can render such discharge methods unusable.

German patent DE 1133310 discloses an example of such a discharger, in which material is discharged through the center of the silo. Material is disadvantageously discharged into a space converged towards the silo center. Further, the discharge ring disadvantageously tends to move upwards when close to the silo walls, as the ring is rotated by toothing placed on the inside of the ring. These disadvantageous are a source of problems in practical discharge work. The same drawbacks are also observed in the apparatus proposed by Finnish patent application FI 832214.

In summary, there is a need for a discharger that is free of the above-noted drawbacks that characterize prior art discharging devices and methods.

The present invention discloses such a discharger.

SUMMARY OF THE INVENTION

A discharger according to the present invention includes a silo-like container whose interior bottom member defines an annular opening at the inner periphery of the container. At least one discharge ring having a toothed or cogged periphery rests above the interior bottom member and is rotatably driven by a drive wheel that rotates preferably about the silo axis. The upper surface of the discharge ring preferably defines a bevelled surface that slopes downward toward the central opening in the discharge ring. The discharge ring can rotate about its own virtual axis, and can also move or orbit about a second axis, for example the silo axis. Tooth-like or cog-like retaining members are disposed on the interior wall of the container. The retaining members cooperate with the periphery of the discharge ring to promote rotary movement about the discharge ring's virtual axis, and preferably to limit its upward movement. Content material within the container is encouraged by operation of the discharge ring to move radially outward and fall through the annular opening defined by the interior bottom member.

Using the present invention, content material is unloaded from under the shell of a round-bottom silo through a ring-like discharge opening on or adjacent the circumference of the silo bottom. The content material moves radially on the silo bottom towards an expanding free space. Thus, the material, which has been under pressure in the silo, can now be loosened, thereby ensuring discharge of any compressed and set material.

A silo discharger according to the present invention uses low operating power because the material is only handled at a variable discharge point. Further, material movement inside the silo is as short as possible because of the radial structure.

According to the present invention, material can easily be uniformly discharged from the whole area of the silo bottom. This property permits material stored in the silo to be handled in a first-in first-out matter, ensuring a uniform retention time. This property handling is especially advantageous if material in the silo is subjected, for example, to thermal or chemical treatment as a function of time (e.g., steaming, bleaching).

Content material discharged from a silo according to the present invention is typically gathered in a collection space provided under the silo bottom, whence the material may be conveyed further by known methods.

The collection space under the silo can also advantageously be used for further treatment of the material, e.g., dilution, mixing of chemicals, etc. The structure and design of the collection space are adapted to the intended use.

Different versions of the present invention may be provided with suitable accessories, e.g., for mixing of materials in the collection space. Instead of a collection space, further conveyance of the material can also be implemented using a conveyor circulating around the silo bottom, a blast conveyor or the like.

Other features and advantages of the invention will appear from the following description in which the preferred embodiments have been set forth in detail, in conjunction with the accompanying drawings.

DETAILED DESCRIPTION OF THE PREFERRED EMBODIMENTS

Figures 1A, 1B:
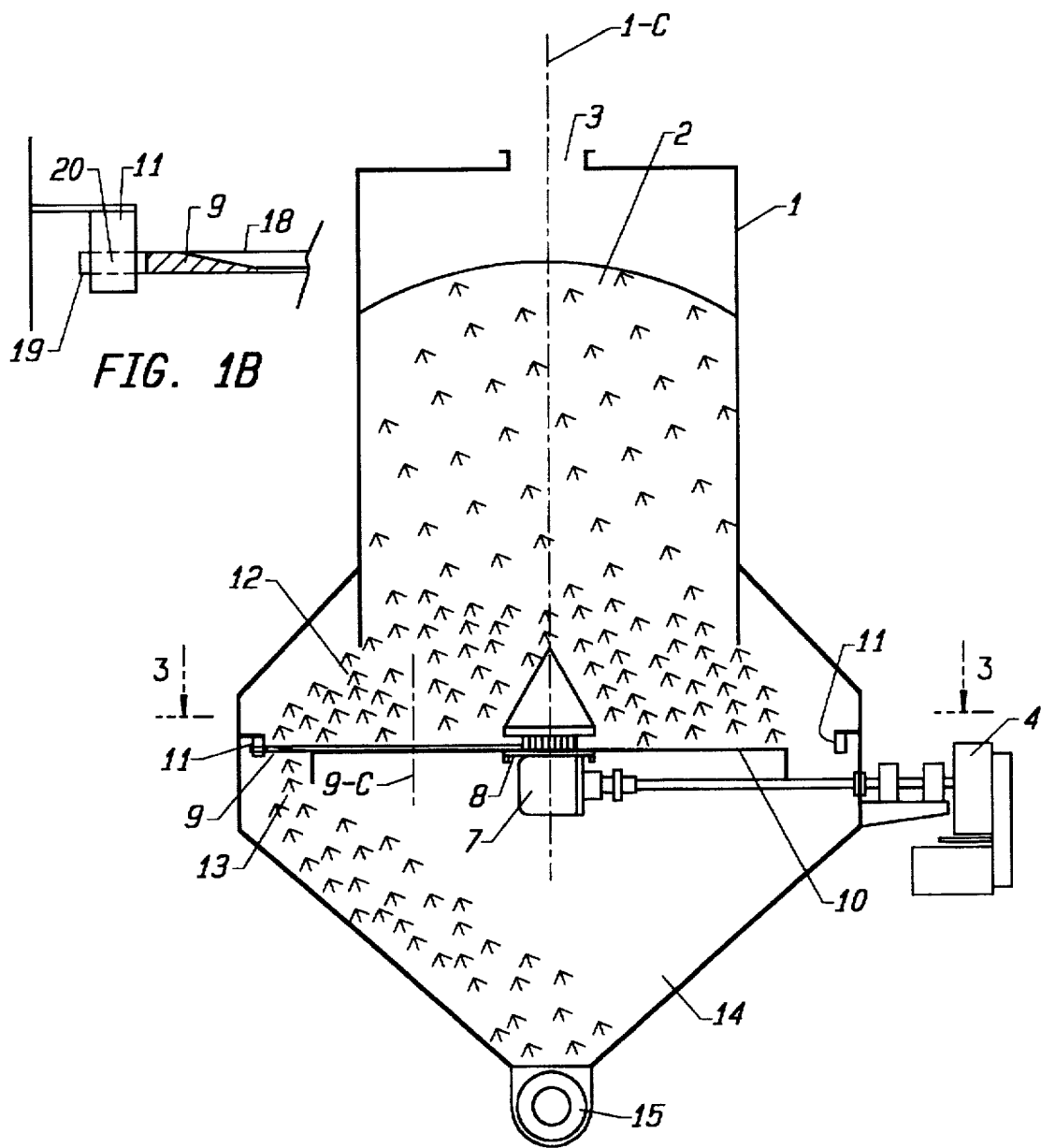
FIG. 1A is a simplified view of a first embodiment of the present invention in vertical section.
FIG. 1B is a partial detailed view of a retaining member and bevelled discharge ring.

FIGS. 1A, 1B, 2A, 2B and 3 show a silo 1 used for the storage of content material 2, which is supplied into the silo through an opening 3. The silo has a bottom 10 that is provided with an annular discharge opening 13, preferably of a ring-like shape. One or more discharge rings 9, 9' are disposed above the upper surface of the silo interior bottom member 10. To empty the silo, i.e., to discharge the content material from the silo, these discharge rings are rotated by a drive system. The drive system preferably comprises a drive 4, a power transmission 7, and a drive wheel 8 connected to a secondary shaft. Drive wheel 8 preferably is provided with shaft journals and teeth. By rotating drive wheel 8, discharge rings 9, 9' are caused to rotate about their own respective centers 9-C, 9'-C', in the directions shown by curved arrows B and B'. Simultaneously, rings 9, 9' are caused to move orbitally about another axis, 1-C, preferably the vertical axis of the silo, in the directions shown by the curved arrows C and C'.

Figures 2A, 2B:
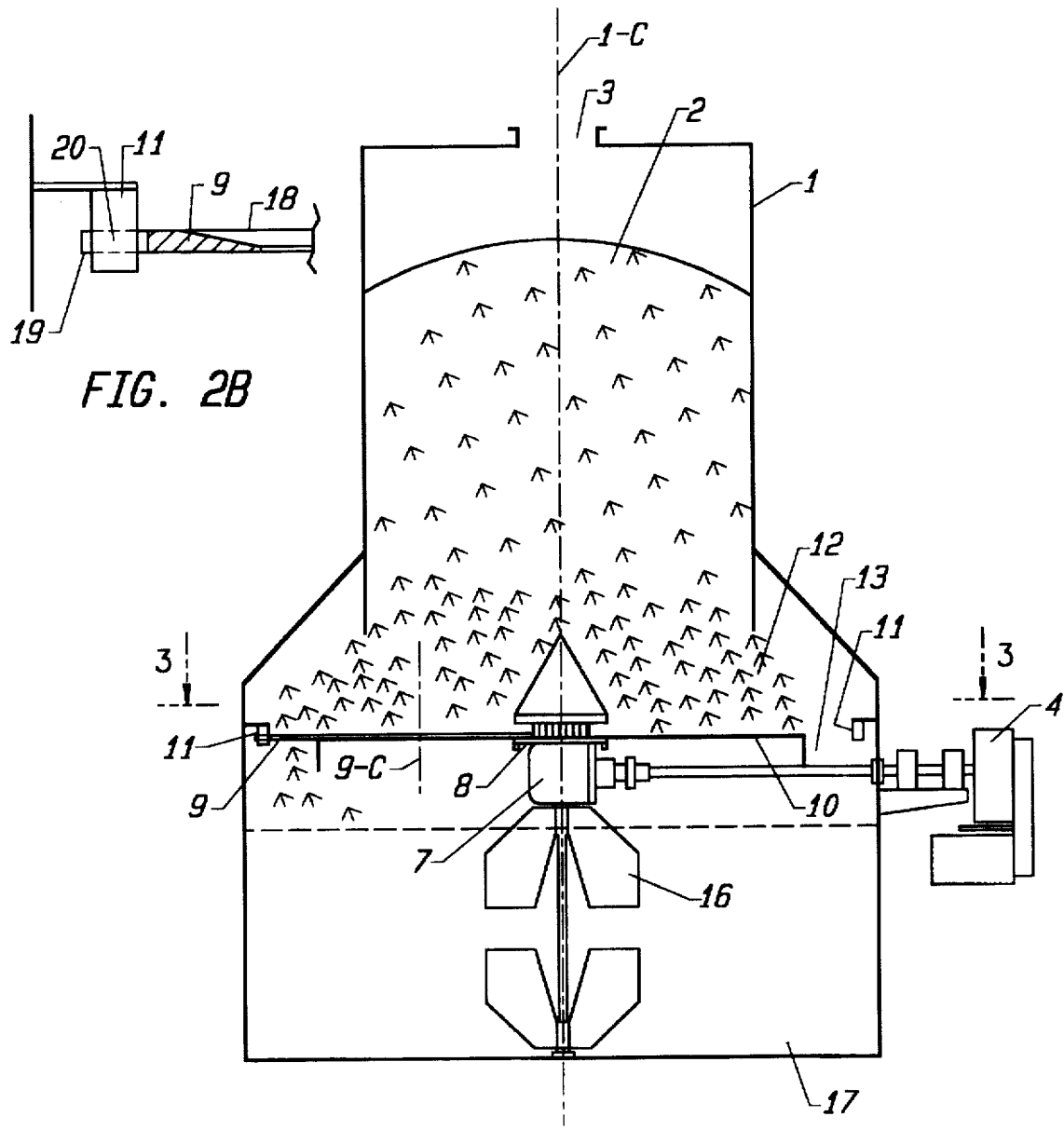
FIG. 2A is a simplified view of a second embodiment of the present invention in vertical section.
FIG. 2B is a partial detailed view of a retaining member and bevelled discharge ring.
Figure 3:
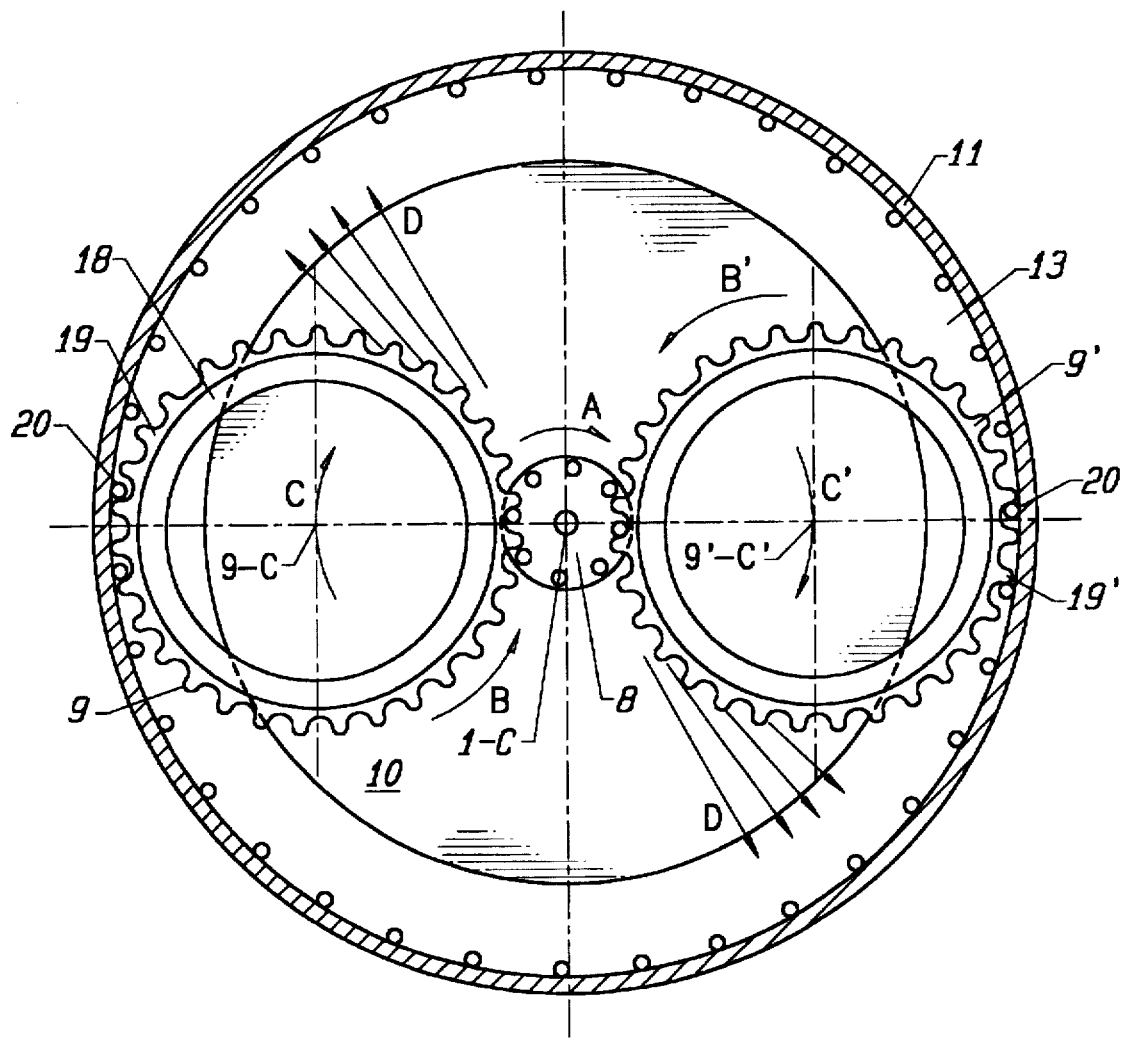
FIG. 3 is a sectional view taken along lines III—III in FIGS. 1A and 2A.

As shown in FIGS. 1B, 2B and 3, the upper surface of a discharge ring 9 preferably defines a bevelled surface 18 that slopes downward toward the central opening defined by the discharge ring. As such, the inner circular radial extent of bevelled edge 18 delimits the outer edge of the central opening in discharge ring 9.

As best seen in FIG. 3, discharge ring(s) 9, 9' have a periphery that includes teeth, notches, or the like 19, 19'. Placed on or near the radially outermost orbit of the discharge rings adjacent the interior surface of the silo walls, is at least one tooth-like or cog-like retaining member 11. Projecting teeth or cogs on member 11 contact the periphery of discharge rings at area 20 and urge rings 9, 9' to rotate about their respective axis 9-C, 9'-C'. Note too from FIGS. 1A and 1B that retaining member 11 limits vertical displacement of a contacted discharge ring.

As seen in the figures, retaining members 11 have a circular body, or may be placed on the circumference of a circle that is disposed within the silo. A portion of the retaining members project in tooth-like or cog-like fashion for cooperation with teeth 19 (or equivalent) formed on the periphery of the discharge rings. The cooperating structure on the periphery of the discharge rings and on the retaining members could include teeth/counter-teeth, pins-notches, holes or the like.

Contact 20 between the retaining rings and the retaining members may advantageously be achieved by using a counter toothing on the retaining members 11 adapted to the toothing 19 on the circumference of the discharge ring 9. It is also possible to use, by way of example, a frictional contact between the discharge ring and the ring on the circumference of the silo. The support elements are placed on the circumference of the silo and are preferably attached to its interior surface, or formed as parts of the interior surface. Formed on, or attached to, the support element is an element that is placed against the top surface of the discharge ring to prevent the latter from rising.

The discharge rings are placed atop the upper surface of the silo bottom and as noted include bevelling 18 on their interior edge to permit the material to be more easily passed thereunder during backward motion D'. The discharge rings 9, 9' are placed on top of the silo bottom 10, preferably in its immediate vicinity or in contact with bottom 10.

As the discharge rings are rotated, they move orbitally in the direction shown by curved arrows C, C' around the silo bottom.

This motion causes the outer edge of the discharge rings to push material radially as shown by arrow D from under the shell 12 of the silo. The pushed material is urged into the annular discharge opening 13, through which it falls into collection space 14, and onto a conveyor 15.

The material is uniformly discharged from the entire area of silo bottom 10 in a first-in first-out manner. Material discharge occurs radially D from under shell 12 of silo 1 into a free space 13 at the outer edge. Thus, discharging does not require much work and therefore the power requirement is small contrasted with known discharging methods used for corresponding materials.

FIGS. 2A and 2B depict a second embodiment of the present invention in which the collection space is a mixing container 17. Mounted in the mixing container are mixing elements 16, to which driving power is transmitted from drive 4 via power transmission gear 7. For example, when high-consistency pulp is to be diluted to a consistency suitable for pumping, this configuration advantageously discharges material uniformly from the entire area of the silo bottom. Further, discharging into the mixing container is performed in the manner described above. It is clear from the above examples and from the figures that the present invention provides an apparatus whose structure enables it to be used in demanding conditions and applications.

One skilled in the art will appreciate that the present invention is not restricted to the embodiments described but by the scope of the following claims.

We claim:

1. An apparatus for discharging material from a silo-like container having walls and an interior bottom member that defines an annular-opening between said interior bottom member and said walls, the apparatus comprising:
   a rotatable discharge ring having an outer periphery and being disposed above said interior bottom member within said walled container, said discharge ring able to rotate about a first axis through its own center and to simultaneously orbit about a second axis;
   at least one retaining member disposed within said walled container above said discharge ring adjacent a radially outermost orbit thereof for contact with said outer periphery of said discharge ring;
   said at least one retaining member and said discharge ring cooperating such that rotation of said discharge ring about said first axis is promoted;
   wherein motion of said discharge ring urges said material within said walled container radially outward toward said annular opening for discharge therethrough.

2. The apparatus of claim 1, wherein said at least one retaining member further prevents said discharge ring from substantial vertical movement away from said interior bottom member.

3. The apparatus of claim 1, wherein said discharge ring is disposed immediately above an upper surface of said interior bottom member.

4. The apparatus of claim 1, wherein:
   said outer periphery of said discharge ring includes a plurality of first members selected from the group consisting of (i) teeth, (ii) cogs, (iii) pins, (iv) notches, and (v) holes; and
   said at least one retaining member includes a plurality of second members formed to engage and cooperate with said first members on said outer periphery of said discharge ring.

5. The apparatus of claim 1, further including:
   a plurality of retaining members disposed within said walled container above said discharge ring adjacent a radially outermost orbit thereof for contact with said outer periphery of said discharge ring, wherein said outer periphery of said discharge ring includes a toothed perimeter and said retaining members include a cog-like projection that cooperates with said toothed perimeter of said discharge ring; and a rotatable drive wheel coupled to said discharge ring to transmit rotation to said discharge ring, wherein rotation of said discharge ring promotes discharge of said material from said container.

6. The apparatus of claim 1, wherein said at least one retaining member has at least one characteristic selected from the group consisting of (i) said at least one retaining member is disposed on an interior circumference of said walls of said walled container, and (ii) said at least one retaining member is an integral portion of an interior circumference of said walls of said walled container.

7. The apparatus of claim 1, further including at least one second discharge ring disposed above said interior bottom member within said walled container, said second discharge ring able to rotate about a third axis through its own center and to simultaneously orbit about said second axis.

8. The apparatus of claim 1, wherein said discharge ring includes a bevelled inner edge.

9. The apparatus of claim 1, further including at least one drive configuration selected from the group consisting of (i) a rotatable drive wheel coupled to said discharge ring to transmit rotation thereto, (ii) a drive unit rotatably coupled to a power transmission gear that is rotatably coupled to said discharge ring to transmit rotation thereto, and (iii) a drive unit rotatably coupled to a power transmission gear that includes a secondary shaft coupled to a mixing element disposed within said walled container, said mixing element mixing said material to be discharged.

10. The apparatus of claim 1, wherein said second axis is a vertical axis of said walled container.

11. An apparatus for discharging material from a silo-like walled container having walls and an interior bottom member that defines an annular-opening between said interior bottom member and said walls, the apparatus comprising:

first and second rotatable discharge rings, each having an outer periphery and being disposed above said interior bottom member within said walled container, the first rotatable discharge ring able to rotate about a first axis through its own discharge ring center and to simultaneously orbit about a second axis, and the second rotatable discharge ring able to rotate about a third axis through its own discharge ring center and to simultaneously orbit said second axis;

a plurality of retaining members disposed within said walled container above said discharge rings and adjacent a radially outermost orbit of said discharge rings for contact with a said outer periphery of each of said discharge rings;

said retaining members and said discharge rings cooperating such that rotation of each of said discharge rings about said second axis is promoted;

wherein motion of said discharge rings urges said material within said walled container radially outward toward said annular opening for discharge therethrough.

12. The apparatus of claim 11, wherein at least some of said plurality of retaining members prevent substantial vertical movement of said discharge rings away from said interior bottom member.

13. The apparatus of claim 11, wherein said plurality of retaining members prevent substantial vertical movement of said discharge rings away from said interior bottom member.

14. The apparatus of claim 11, wherein each of said discharge rings is disposed immediately above an upper surface of said interior bottom member.

15. The apparatus of claim 11, wherein:

said outer periphery of said first discharge ring includes a plurality of first members selected from the group consisting of (i) teeth, (ii) cogs, (iii) pins, (iv) notches, and (v) holes; and said plurality of retaining members is formed to engage and cooperate with said first members on said outer periphery of said first discharge ring.

16. The apparatus of claim 11, wherein:

said outer periphery of each of said discharge rings includes a plurality of first members selected from the group consisting of (i) teeth, (ii) cogs, (iii) pins, (iv) notches, and (v) holes; and said plurality of retaining members is formed to engage and cooperate with said first members on said outer periphery of said discharge rings.

17. The apparatus of claim 11, wherein:

said outer periphery of each of said discharge rings includes teeth, and said retaining members include a cog-like projection that cooperates with said teeth;

and said apparatus further including means for transmitting rotation to each of said discharge rings.

18. The apparatus of claim 11, wherein said retaining members have at least one characteristic selected from the group consisting of (i) said retaining members are disposed on an interior circumference of said walls of said walled container, and (ii) said retaining members are formed as an integral portion of an interior circumference of said walls of said walled container.

19. The apparatus of claim 11, wherein at least one of said discharge rings includes a bevelled inner edge.

20. The apparatus of claim 11, further including at least one drive configuration selected from the group consisting of (i) a rotatable drive wheel coupled to each of said discharge rings to transmit rotation thereto, (ii) a drive unit rotatably coupled to a power transmission gear that is rotatably coupled to each of said discharge rings to transmit rotation thereto, and (iii) a drive unit rotatably coupled to a power transmission gear that includes a secondary shaft coupled to a mixing element disposed within said walled container, said mixing element mixing said material to be discharged.

* * * * *